US012521525B2

(12) United States Patent
Ravi et al.

(10) Patent No.: US 12,521,525 B2
(45) Date of Patent: Jan. 13, 2026

(54) MAGNETICALLY-TRACKED CATHETER AND METHOD FOR TRACKING A CATHETER

(71) Applicant: Stryker Corporation, Portage, MI (US)

(72) Inventors: Ananth Ravi, Toronto (CA); Mark Semple, Toronto (CA); Alexandru Nicolae, Toronto (CA); John Dillon, Mississauga (CA)

(73) Assignee: Stryker Corporation, Portage, MI (US)

( * ) Notice: Subject to any disclaimer, the term of this patent is extended or adjusted under 35 U.S.C. 154(b) by 568 days.

(21) Appl. No.: 17/621,197

(22) PCT Filed: Jun. 19, 2020

(86) PCT No.: PCT/IB2020/000495
§ 371 (c)(1),
(2) Date: Dec. 20, 2021

(87) PCT Pub. No.: WO2020/254875
PCT Pub. Date: Dec. 24, 2020

(65) Prior Publication Data
US 2022/0347432 A1 Nov. 3, 2022

Related U.S. Application Data

(60) Provisional application No. 62/863,623, filed on Jun. 19, 2019.

(51) Int. Cl.
*A61B 34/20* (2016.01)
*A61B 17/12* (2006.01)
(Continued)

(52) U.S. Cl.
CPC ... *A61M 25/0127* (2013.01); *A61B 17/12109* (2013.01); *A61B 17/12136* (2013.01);
(Continued)

(58) Field of Classification Search
CPC ...... A61M 25/0127; A61M 2025/0166; A61B 17/12109; A61B 17/12136; A61B 34/20;
(Continued)

(56) References Cited

U.S. PATENT DOCUMENTS 5,830,222 A * 11/1998 Makower ........... A61B 17/1219
623/1.11
5,897,529 A * 4/1999 Ponzi ................. A61M 25/0147
604/524

(Continued)

FOREIGN PATENT DOCUMENTS

| CA | 2737061 A1 | 3/2010 |
| CA | 2867460 A1 | 9/2013 |

(Continued)

OTHER PUBLICATIONS

European Search Report dated Jun. 21, 2023, directed to EP Application No. 20827124.7; 8 pages.

(Continued)

*Primary Examiner* — Joel Lamprecht
(74) *Attorney, Agent, or Firm* — Morrison & Foerster LLP (57) ABSTRACT

A magnetically-tracked catheter system having a catheter and a magnetic beacon. The catheter has a proximal end and a distal end. The catheter includes a first magnetic sensor disposed at (i.e., near) the distal end. The magnetic beacon is configured to be disposed external to an individual and in a target zone. An operator interface is in electronic communication with the first magnetic sensor. The catheter may further include a guide lumen (and/or other lumen or lumens) extending between the proximal end and the distal end and the configured for use with a guidewire. The catheter may include an occlusion member configured to
(Continued)

occlude a vessel or other passage of an individual (e.g., respiratory tract, gastrointestinal tract, etc.).

18 Claims, 6 Drawing Sheets

(51) Int. Cl.
    *A61M 25/01*     (2006.01)
    *A61B 17/00*     (2006.01)
    *A61B 90/00*     (2016.01)

(52) U.S. Cl.
    CPC .... *A61B 34/20* (2016.02); *A61B 2017/00725* (2013.01); *A61B 2034/2051* (2016.02); *A61B 2090/3958* (2016.02); *A61M 2025/0166* (2013.01)

(58) Field of Classification Search
    CPC .. A61B 2017/00725; A61B 2034/2051; A61B 2090/3958; A61B 2017/00119; A61B 2034/2048; A61B 17/12022; A61B 2090/3954; A61B 2090/3966

See application file for complete search history.

(56) References Cited

U.S. PATENT DOCUMENTS

| | | | | |
|---|---|---|---|---|
| 5,928,248 | A * | 7/1999 | Acker | A61F 2/954 |
| | | | | 623/1.11 |
| 7,881,769 | B2 * | 2/2011 | Sobe | A61B 17/3207 |
| | | | | 600/424 |
| 9,459,087 | B2 * | 10/2016 | Dunbar | G01B 7/003 |
| 11,065,061 | B2 * | 7/2021 | Makower | A61B 5/6851 |
| 2004/0097804 | A1 | 5/2004 | Sobe | |
| 2014/0257080 | A1 * | 9/2014 | Dunbar | A61B 5/062 |
| | | | | 600/409 |
| 2015/0327836 | A1 | 11/2015 | Stone et al. | |
| 2019/0343422 | A1 * | 11/2019 | Shlomovitz | A61B 5/062 |
| 2020/0329995 | A1 * | 10/2020 | Stone | A61B 5/065 |

FOREIGN PATENT DOCUMENTS

| | | |
|---|---|---|
| CN | 204909546 U | 12/2015 |
| EP | 3808266 A1 | 4/2021 |
| WO | 2018127844 A1 | 7/2018 |

OTHER PUBLICATIONS

International Preliminary Report on Patentability mailed Dec. 21, 2021, directed to International Application No. PCT/IB2020/000495; 7 pages.

International Search Report and Written Opinion mailed Nov. 3, 2020, directed to International Application No. PCT/IB2020/000495; 10 pages.

* cited by examiner

MAGNETICALLY-TRACKED CATHETER AND METHOD FOR TRACKING A CATHETER

CROSS-REFERENCE TO RELATED APPLICATIONS

This application claims priority to U.S. Provisional Application No. 62/863,623, filed on Jun. 19, 2019, the disclosure of which is incorporated herein by reference.

FIELD OF THE DISCLOSURE

The present disclosure relates to catheters, and in particular, a catheter system for fluoroscopy-free catheter localization.

BACKGROUND OF THE DISCLOSURE

Uncontrolled traumatic injuries account for over 30% of trauma-related deaths globally per year and are the leading cause of death for those aged 15-24 in developed nations. Exsanguination from non-compressible truncal hemorrhage is the leading cause of potentially preventable death in trauma patients worldwide. In cases of penetrating injuries with blood loss that cannot be controlled through compression (termed non-compressible torso hemorrhages, or "NCTH"), the primary therapeutic strategies include: bleeding control, ensuring vital organs remain oxygenated, maintenance of central blood pressure, bolstering depleted coagulation pathways, and ensuring normal body temperature. Patients with NCTH have a risk of mortality, between 15-50%; in particular, injuries to the inferior vena cava have mortality rates as high as 80% due to the obstruction of the vessel by the liver. Patients with inferior vena cava injuries have a high-risk of exsanguination if immediate lifesaving interventions are not applied to arrest the blood loss. The treatment strategy of providing temporary hemostasis as early as possible has been adopted over the last decade, with a clear emphasis on providing resuscitative/hemorrhagic control efforts as soon as possible. However, expeditious hemorrhage control in NCTH outside of the operating room or the angiography suite can be a significant challenge even for seasoned surgeons.

Resuscitative Thoracotomy

The longstanding approach to controlling hemorrhages in the torso is a procedure called resuscitative thoracotomy ("RT"), with aortic cross-clamping. This procedure is highly invasive, requiring a trained acute care surgeon to open the chest wall and gain access to the relevant vessels. The surgeon then clamps the aorta with a hemostatic clamp. Once temporary control of the hemorrhage is achieved, permanent definitive hemostasis can be accomplished by addressing the primary injuries. Injuries to the inferior vena cava, require cross-clamping in addition to that used on the aorta. Due to the additional operative time, invasiveness, and complications associated with this procedure, a modest improvement in survival rate to 25-30% is achieved. Resuscitative thoracotomy with aortic and/or inferior vena cava cross-clamping requires a skilled acute care surgeon to perform the procedure after the patient comes to the emergency department.

Resuscitative Endovascular Balloon Occlusion of the Aorta ("REBOA")

Resuscitative thoracotomy techniques require training and resources that are not commonly available to local emergency physicians, first responders or field paramedics. Resuscitative endovascular balloon occlusion of the aorta (REBOA) has become an attractive alternative to RT and is increasingly being studied in emergency and trauma medicine.

Lieutenant colonel Carl W. Hughes in 1954 reported the first use of REBOA during the Korean war, where a balloon catheter was used to arrest aortic bleeding of injured soldiers successfully. The REBOA technique enables aortic tamponade as a minimally invasive procedure. REBOA now presents the possibility of providing first responders, emergency physicians and field medics, the ability to treat NCTH without relying on acute trauma surgeons and extensive operating room resources.

The REBOA technique involves a number of steps to obtain control of vessel hemorrhage: (1) accessing the femoral artery; (2) positioning the balloon in the aorta, using fluoroscopy or verifying its position using an x-ray; (3) balloon inflation; (4) achieving permanent hemostasis; and (5) deflation of the balloon and removal of the catheter apparatus.

Studies have shown in a retrospective meta-analysis that the risk of mortality was significantly lower among patients who underwent REBOA, compared to those that underwent RT. Additionally, animal studies have demonstrated that inferior vena cava injuries could be survivable, with temporary hemostatic control achieved through the use of three REBOA catheters.

Advancements in the REBOA technology helped to expand its use in the prehospital phase, and as point-of-injury resuscitation strategy in the military setting. Wire-free device technology could expedite balloon deployment and occlusion of the aorta. However, ensuring proper anatomical position of the balloon in the correct aortic zone remains a critical step of the REBOA procedure. Real-time fluoroscopy is the standard technique to guide placement of the balloon in a target aortic zone.

The current standard deployment workflow involves a guide wire being inserted through the femoral artery and advanced just superior to the site of injury. A suitable catheter, such as the CODA® from Cook Medical, is then advanced overtop of the guidewire, and when at the correct location, verified by x-ray, the guide wire is removed. There are a number of disadvantages with this technique: (1) the catheters are large (for example, 12 French/4 mm in diameter), and the hole required for insertion of the catheter into the femoral artery often requires surgical repair; (2) the use of a guidewire requires fluoroscopic guidance to ensure accurate placement; and (3) the catheters themselves are not rigid enough to be advanced without a guidewire.

Several non-radiographic (fluoroscopy-free) methods have been described for REBOA catheter placement. A relatively new catheter (the ER-REBOA™ from Prytime Medical) appears to address most of the issues with the conventional guide-wire based approach. The benefits of the ER-REBOA catheter include: (1) a 7 F catheter diameter, enabling simple compression to stop femoral arterial bleeding; (2) the polymer catheter shaft has a coextruded Nitinol hypotube to provide it with the necessary structure so that the catheter can be inserted without a guidewire (increased pushability); (3) a loop is provided at the tip of the catheter to limit the risk of the catheter turning back on itself or being misdirected down smaller vasculature; and (4) gradations are provided along the catheter to determine how far the catheter has been advanced into the vasculature.

Fluoroscopy is arguably the most effective method to reduce the incidence of complications related to REBOA catheter malposition but it is not available in every setting.

Therefore, non-image-guided REBOA techniques have been proposed for accurate landing of the balloon. Non-image-guided techniques (blind placement) call for pre-defined anatomical landmarks and wire-free catheters with centimeter markings to estimate the distance to the desired aortic zone. Additional methods using thermal imaging (Forward-Looking Infrared Thermal imaging—FLIR), radiofrequency identification (RFI), and ultrasound-guided techniques have also been described. However, inherent limitations reduce the reliability of those methods. Ultrasonography is highly operator dependent and is limited by gastrointestinal air and obesity. FLIR technology is compromised by trauma-related variables that reduce overall body temperature, and RFI has low specificity and limited spatial accuracy particularly in aortic target zone 3, additionally, miniaturization of the required equipment is burdensome. Although a fixed-distance approach based on anatomical landmarks has been validated using whole-body computed tomography scan models and cadaver studies, the risk of catheter malposition from a standardized entry point remains. Moreover, such a fixed-distance approach does not address catheter malposition related to catheter migration or displacement after the initial balloon landing.

Despite the practicality, current fluoroscopy-free methods do not allow the operator to track the balloon to the desired aortic target zone. At a minimum, incorrectly placed catheters cause a loss of precious time. If the balloon is placed higher than the desired target landing, blood flow to the brain could be blocked, or if placed lower, the balloon could cause additional trauma to healthy vasculature. There remains a need for a REBOA technology that includes the ability to rapidly and unambiguously verify the position of the balloon using external body landmarks without complex imaging devices.

BRIEF SUMMARY OF THE DISCLOSURE

A magnetically-tracked catheter system having a catheter and a magnetic beacon. The catheter has a proximal end and a distal end. The catheter includes a first magnetic sensor disposed at the distal end. It should be noted that the terms proximal end and distal end are intended herein to broadly convey portions of a catheter which are configured to be inserted into a cavity of an individual (distal end) and which remain external to the individual when in use (proximal end). As such, a first magnetic sensor (or any component) disposed at the distal end is not necessarily located at the distal-most limit of the catheter, but may be located at a position offset from the distal-most limit. The magnetic beacon is configured to be disposed external to an individual and in a target zone. An operator interface is in electronic communication with the first magnetic sensor. The catheter may further include a guide lumen (and/or other lumen or lumens) extending between the proximal end and the distal end and the configured for use with a guidewire.

The catheter may further comprise an occlusion member at the distal end proximate to the first magnetic sensor, the occlusion member configured for vessel occlusion. The catheter further comprise an inflation lumen disposed through the catheter and in operable communication with the occlusion member.

The catheter may further comprise a second magnetic sensor disposed at the distal end of the catheter and proximate the occlusion member such that the occlusion member is disposed between the first magnetic sensor and the second magnetic sensor, and wherein the operator interface is in electronic communication with the second magnetic sensor.

The operator interface may include a detection circuit configured to detect a location of the magnetic beacon based on signals received from the first magnetic sensor and (when present) the second magnetic sensor.

The catheter may further comprise a third magnetic sensor spaced apart from the first magnetic sensor and the second magnetic sensor, and wherein the operator interface is in electronic communication with the third magnetic sensor. The third magnetic sensor may be spaced apart from the first magnetic sensor and/or the second magnetic sensor by at least a reference distance.

The magnetic beacon may comprise a magnet. In some embodiments, the magnet is a permanent magnet. In some embodiments, the magnet is an electromagnet configured to be selectively magnetized or demagnetized. In some embodiments, the magnetic beacon is configured to have a variable magnetic field. In some embodiments, the magnetic beacon is configured to have a magnetic field which varies by frequency and/or magnitude.

The operator interface may include a detection circuit configured to detect a location of the magnetic beacon based on signals received from the first magnetic sensor. The operator interface may be operable to indicate a location of the magnetic beacon relative to the first magnetic sensor. The operator interface may be operable to indicate a location of the magnetic beacon relative to the first magnetic sensor and the second magnetic sensor.

In another embodiment, a method for catheter tracking includes placing a magnetic beacon on an individual in a target zone. A catheter is inserted into a cavity of the individual, wherein the catheter has a first magnetic sensor disposed at a distal end. The catheter is advanced into the cavity until a strength of a magnetic field detected by the first magnetic sensor is indicative of the distal end of the catheter being at a desired location. The desired location may be, for example, a location where the first magnetic sensor is adjacent to the magnetic sensor. In another example, the desired location may be a location where the first magnetic sensor is offset from the magnetic sensor.

The first magnetic sensor may be in communication with an operator interface, and the operator interface indicates a relative strength of a sensed magnetic field of the magnetic beacon. The catheter may include a second magnetic sensor near the distal end. In some embodiments, advancing the catheter is further based on a strength of a magnetic field detected by the second magnetic sensor.

In another embodiment, a method for vessel occlusion includes placing a magnetic beacon on an individual in a target zone. An occlusion member catheter is inserted into a vessel of the individual. The occlusion member catheter has an inflatable occlusion member and a first magnetic sensor disposed proximate to the occlusion member. The occlusion member catheter is advanced into the vessel until a strength of a magnetic field detected by the first magnetic sensor is indicative of the occlusion member being at a location adjacent to the magnetic sensor. The occlusion member is inflated to occlude the vessel, thereby stopping a flow of blood through the vessel. The first magnetic sensor may be in communication with an operator interface, and the operator interface indicates a relative strength of a sensed magnetic field of the magnetic beacon.

In some embodiments, the catheter includes a second magnetic sensor in communication with the operator interface and the occlusion member is located between the first magnetic sensor and the second magnetic sensor. The occlusion member (occlusion member catheter) is advanced further based on a strength of a magnetic field detected by the second magnetic sensor (for example, before inflation of the occlusion member. For example, the occlusion member catheter may be further advanced until the strength of the magnetic field detected by the first magnetic sensor is equal to a strength of the magnetic field detected by the second magnetic sensor. The method may include calibrating the first magnetic sensor and/or (when present) the second magnetic sensor.

DESCRIPTION OF THE DRAWINGS

For a fuller understanding of the nature and objects of the disclosure, reference should be made to the following detailed description taken in conjunction with the accompanying drawings.

DETAILED DESCRIPTION OF THE DISCLOSURE

Systems and methods according to the present disclosure solve the main problem associated with current catheter technologies by incorporating magnetic position tracking into the catheter. With the addition of magnetic tracking, the requirement for fluoroscopic tracking may be reduced. In a particular embodiment, the addition of magnetic tracking with REBOA catheters, the goal of achieving aortic occlusion by first responders may be achieved. Such magnetic tracking could act as a radiation-free confirmation of distal end position (e.g., occlusion member(s), port(s), etc.), eliminating the need for C-arm imaging for confirmation.

Figure 1:
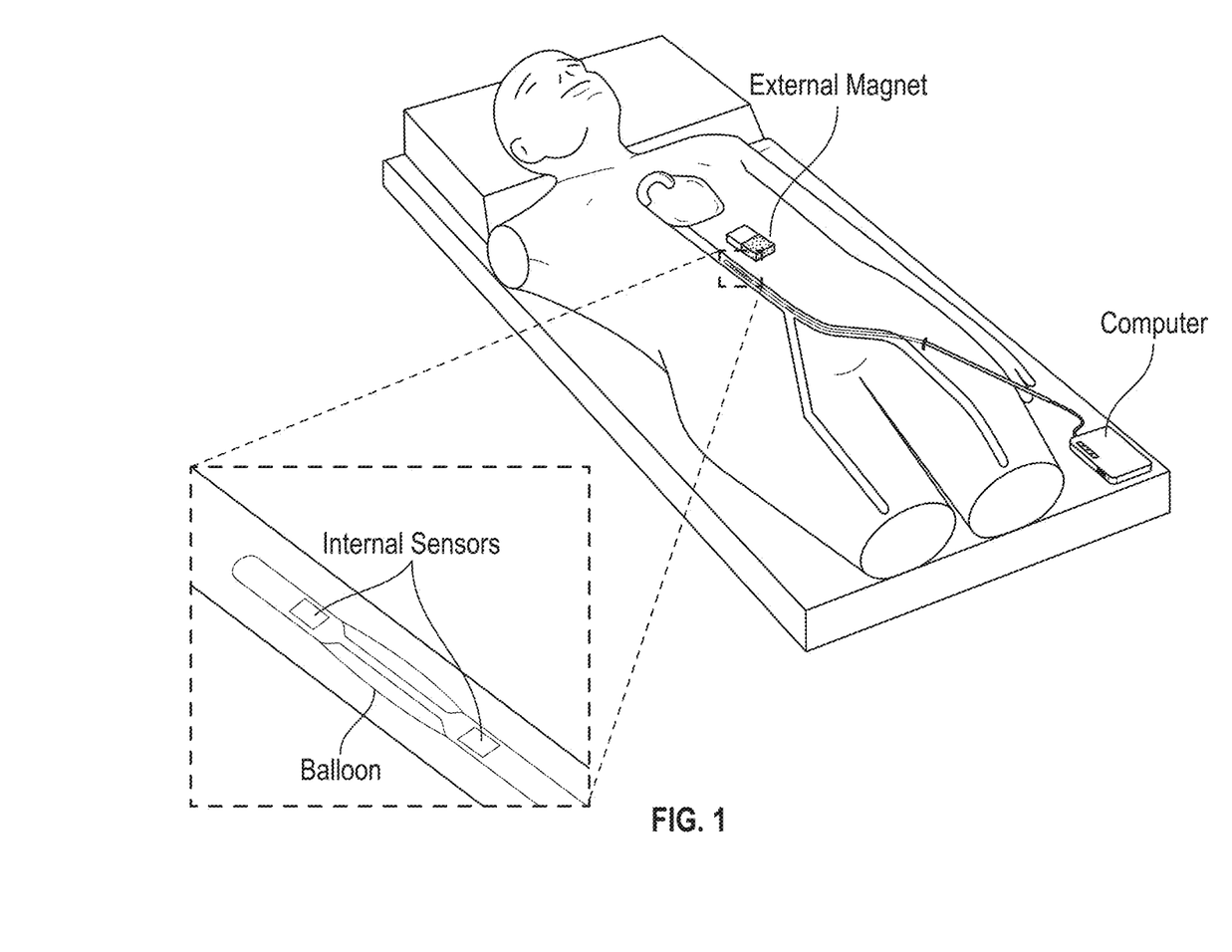
FIG. 1 is a diagram of an embodiment of MT-REBOA. The catheter is advanced into the aorta through the femoral artery. The feedback controller provides an auditory/visual signal that the balloon is under the magnetic marker, which is placed on the patient's anterior surface.
Figure 2:
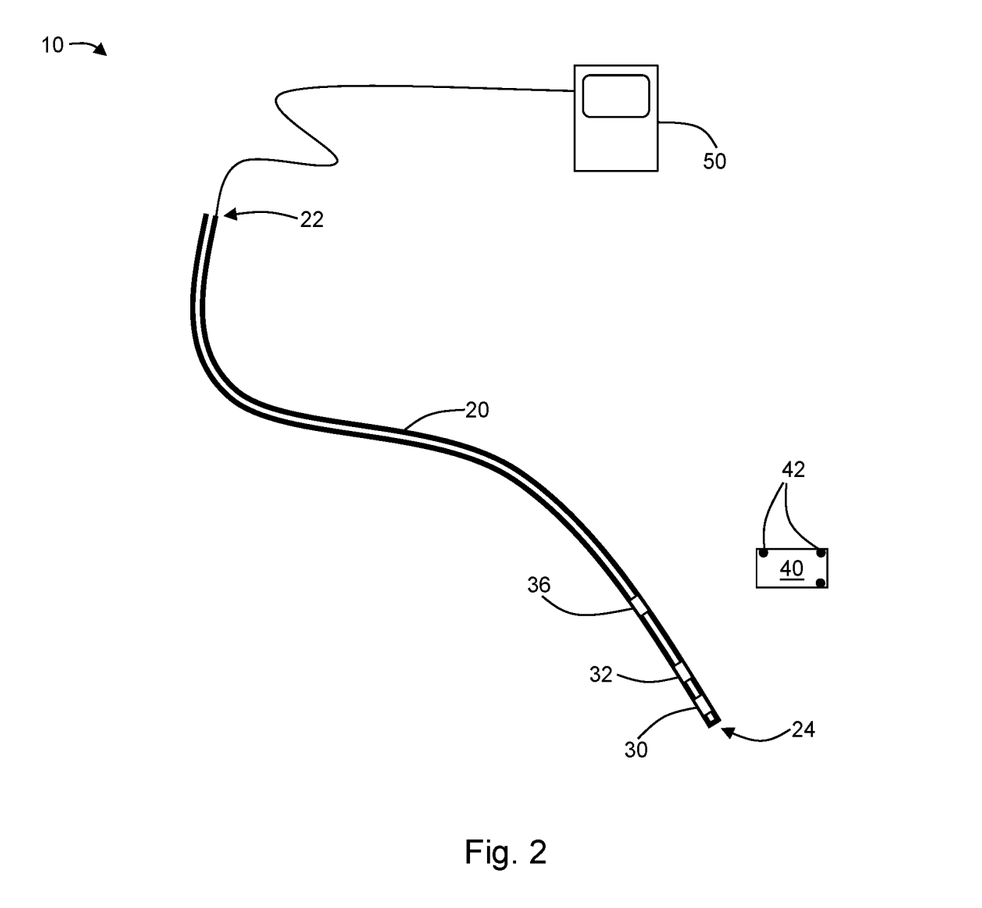
FIG. 2 depicts another embodiment of a system according to another embodiment of the present disclosure.

With reference to FIG. 2, in a first aspect, the present disclosure may be embodied as magnetically-tracked catheter system 10. The system 10 includes a catheter 20 having a proximal end 22 and a distal end 24. The catheter 20 is configured such that, in use, the distal end 24 is inserted and advanced into an individual (i.e., into a lumen, such as a vessel, of the individual), and the proximal end 22 remains external to the individual for interaction with an operator (medical practitioner). The catheter 20 may be made from any materials commonly used for such devices, such as, for example, biocompatible polymers. In some embodiments, the catheter 20 is made from a material having sufficient rigidity such that the catheter may be inserted/advanced without the use of a guidewire. In some embodiments, the catheter incorporates members that lend column strength to the catheter (providing a "backbone"—pushability). Such catheters may also be suitable for insertion/advancement without the need of a guidewire or other introduction member. In some embodiments, the stiffness of the catheter shaft varies along its length such that the distal end may have less stiffness than the proximal end. In some embodiments, the catheter shaft contains stiffening wires which may also carry electric signals or currents. In some embodiments, the catheter shaft, while homogenous in appearance, is comprised of multiple materials bonded together to form a cohesive shaft.

The catheter 20 includes a first magnetic sensor 30 at (e.g., on or near) the distal end. The first magnetic sensor 30 may be any sensor capable of sensing a magnetic fields and providing a signal based on the sensed magnetic fields. For example, the first magnetic sensor 30 may be a magnetometer. The magnetometer may be, for example, a traditional magnetic sensor, a micro-electromechanical system (MEMS) magnetometer, a passive pick-up coil (e.g., a wound copper coil), or any other type of device to sense and/or measure magnetism. The first magnetic sensor 30 has a diameter compatible with the size of the catheter 20. For example, the magnetic sensor 30 may have a diameter suitable for insertion through a vessel. In a particular example, the diameter of the first magnetic sensor 30 may be 2 mm or less. Other diameters may be used and will be apparent to one having skill in the art in light of the present disclosure.

The system 10 further comprises a magnetic beacon (marker) 40. The magnetic beacon 40 may include, or may be, a magnet, such as, for example, a permanent magnet. In some embodiments, the magnetic beacon is a magnet configured to have a variable magnetic field, such as, for example, an electromagnet. In this way, the magnetic beacon can be selectively magnetized (to varying degrees) or demagnetized. For example, an intensity (i.e., magnitude), frequency, phase, etc. of the magnetic field of an electromagnet may have any desired waveform (e.g., may oscillate at a selected magnitude and/or frequency, etc.) In another example, the magnetic field may be configured to alternate (e.g., swapping north and south poles over time) and/or otherwise change orientation (e.g., changing orientation of north and south poles in space). As such, the magnetic field of the magnetic beacon may be uniquely identified using the first magnetic sensor (or any magnetic sensor). The magnetic beacon 40 is configured to be disposed external to a body (e.g., a body of an individual, an animal, or any structure) and in a target zone. For example, in an embodiment wherein the system is an MT-REBOA for occluding the aorta of an individual (as further described below), the target zone is the external location (outside the body of the individual) adjacent to the aorta (i.e., at the desired occlusion location). The magnetic beacon 40 may include markers 42 corresponding to reference points on the body (for example, for alignment with anatomical landmarks according to a particular application). In some embodiments, the markers 42 may include fiducial markers, such as, for example, radiopaque markers.

The system 10 further comprises an operator interface 50 for interaction with an operator of the system. The operator interface 50 is in electronic communication with the first magnetic sensor 30. For example, the operator interface 50 may be in wired and/or wireless communication with the first magnetic sensor 30. In this way, as the first magnetic sensor 30 senses a magnetic field (i.e., of the magnetic beacon), a signal is provided to the operator interface 50 corresponding to the sensed magnetic field. The signal may vary according to the detected strength of the magnetic field. For example, the signal may have an amplitude (e.g., a voltage value) which increases as the strength of the magnetic field increases. In another example, the signal may have a frequency which increases (or decreases) based on an increasing strength of the sensed magnetic field. Other signaling techniques (and combinations of techniques) can be used and will be apparent to one having skill in the art in light of the present disclosure. The operator interface may be any device for direct or indirect interaction with an operator of the system. For example, the operator interface may be one or more of a controller, microcontroller, processor, computer, application-specific integrated circuit (ASIC), field-programmable gate array (FPGA), or any type of integrated or non-integrated (e.g., discrete) circuit, or a combination of any one or more of these. Furthermore, the operator interface may include hardware, software, firmware, or any combination of hardware, software, and/or firmware.

The operator interface 50 may convert the signal received from the first magnetic sensor 30 into a form usable to an operator. For example, the operator interface 50 may have a display screen indicating a numeric value representing the strength of the sensed magnetic field. In another example, the operator interface may have indicator lights which may change (e.g., in color, in intensity, etc.) according to the strength of the sensed magnetic field. In another example, the operator interface may emit a sound or sounds which change (e.g., in frequency, in volume, etc.) according to the strength of the sensed magnetic field. Other indicia or combinations of these or other indicia may be used.

Figure 3:
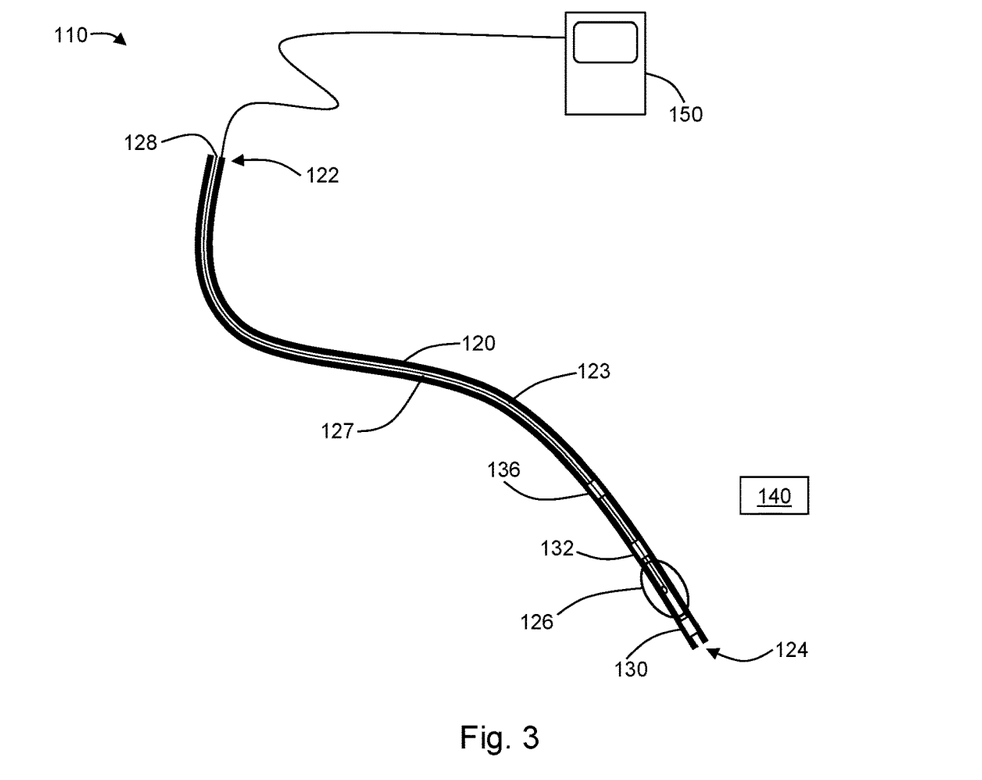
FIG. 3 depicts another embodiment of a system according to another embodiment of the present disclosure.

In a particular embodiment, a magnetically-tracked catheter system 110 may be configured for magnetically-tracked REBOA ("MT-REBOA"), for example, as depicted in FIG. 3. In such embodiments, the catheter 120 includes an occlusion member 126 at the distal end 124, wherein the occlusion member 126 is configured to occlude a vessel 90 when in an expanded (or partially expanded) state. The occlusion member 126 is located near the first magnetic sensor 130. The occlusion member 126 may be, for example, a balloon or another expandable member capable of occluding a vessel. The occlusion member 126 may have any shape and/or size selected for the application at hand. For example, where the system 110 is configured for MT-REBOA, the occlusion member 126 is sized to occlude an aorta of an individual when inflated. When in a contracted state, the occlusion member may be sized to, for example, pass through an incision and into a vessel. In some embodiments, the catheter is configured for use with a percutaneous sheath. In such embodiments, the occlusion member has a contracted-state diameter compatible with the use of such a percutaneous sheath. An inflation lumen 127 is disposed through a length of the catheter 120 and is in operable communication with the occlusion member 126. For example, the inflation lumen 127 may extend from the proximal end 122 of the catheter 120 to the occlusion member 126, such that an operator at the proximal end 122 is able to selectively expand and deflate the occlusion member 126.

The occlusion member 126 may be expanded using a fluid (such as a gas and/or liquid) as is known. For example, the occlusion member 126 may be expanded using saline. As such, the inflation lumen 127 may terminate at a port 128 at the proximal end 122 of the catheter 120. The port 128 may be configured for attachment to, for example, a syringe. For example, the port 128 may be configured as a luer lock fitting. Catheters of the present disclosure may have one or more additional lumen. Such lumen(s) may be used for any purpose, including inflation of additional occlusion member(s); wiring, access for guidewires, tools, catheters, etc.; access for infusion of medicament or other fluids; access for blood flow; etc. Such one or more additional lumens may run the entire length of the catheter body or terminate at any useful location or locations along the catheter. For example, the system 110 depicted in FIG. 3 also depicts an additional lumen 123 extending from the proximal end 122 to the distal end 124 of the catheter.

Figure 4:
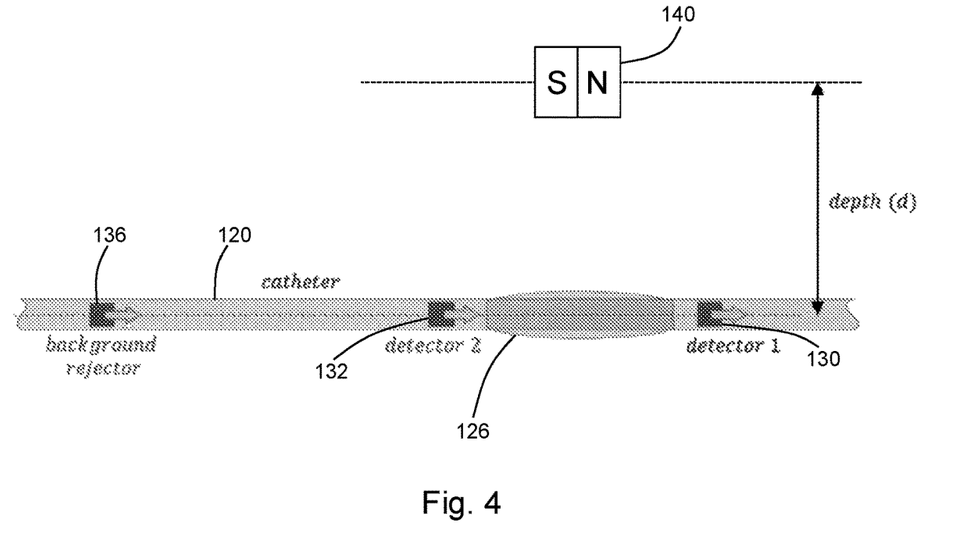
FIG. 4 is a detail view of a distal end of the system of FIG. 3.

In some embodiments, the catheter 20 may have a second magnetic sensor 32 disposed at the distal end 24. The second magnetic sensor 32 is spaced apart from the first magnetic sensor 30. For example, in catheters having additional structures at the distal end (e.g., occlusion member(s), port(s), etc.), such structures may be disposed between the first magnetic sensor 30 and the second magnetic sensor 32. In MT-REBOA embodiments, the components may be configured such that the occlusion member 126 is located between the first magnetic sensor 130 and the second magnetic sensor 132 (along the length of the catheter 120). The second magnetic sensor 32 may be of any design (size, material, etc.) as described above with respect to the first magnetic sensor 30. The second magnetic sensor 32 may be the same (e.g., having the same size, shape, and/or material, etc.) as the first magnetic sensor 30, or the magnetic sensors may be different.

In some embodiments, a catheter 20 may additionally include a third magnetic sensor 36 spaced apart from the first magnetic sensor 30 and (when present) the second magnetic sensors 32. The third magnetic sensor 36 is preferably located at a distance from the first and second magnetic sensors 30,32 such that the magnetic field of the magnetic beacon 40 has no effect or a negligible effect on the third magnetic sensor 36 (such distance is referred to herein as a "reference distance"). In this way, the third magnetic sensor 36 may be used to provide a background magnetic field value that may be, for example, subtracted from the values sensed by the first and second magnetic sensors 30,32, thereby providing sensed value more specifically dependent on the strength of the field of the magnetic beacon 40.

In use, a magnetic beacon 140 may be placed at a target zone of an individual. For example, the target zone may be adjacent to the desired location for aortic occlusion. A catheter according to any of the embodiments herein may be fed into a cavity of the individual (e.g., into a vessel, gastrointestinal tract, respiratory tract, etc.) For convenience, and in no way intending to be limiting, advancement into a vessel is used to describe aspects of the present disclosure. The catheter may be advanced into the cavity (e.g., vasculature) of the individual and as the magnetic sensor(s) (e.g., the first and/or second magnetic sensors of the catheter) begin sensing the magnetic field of the magnetic beacon, the operator interface 150 will provide an indication to the operator accordingly (e.g., an alarm, a graphic representation, tactile feedback, etc.) The operator may advance the catheter 120 until the strength of the sensed magnetic field indicates that the occlusion member 126 is at a location adjacent to the magnetic beacon 140. For example, in an embodiment with a single magnetic sensor (e.g., first magnetic sensor 130) located distally with respect to the occlusion member 126, the catheter 120 is advanced until the strength of the magnetic field reaches a peak value (e.g., until the value begins to decline and then back to the peak). The catheter may then be advanced a further distance according to the occlusion member used (for example, advanced an additional distance corresponding to a length or a half-length of the occlusion member, distance between the magnetic sensor and the occlusion member, and/or some other distance so as to position the occlusion member at a desired location). In an embodiment wherein the catheter includes a second magnetic sensor, the catheter may be advanced until the difference in field strength between the first magnetic sensor and the second magnetic sensor is minimized. In light of the present disclosure, one having skill in the art will recognize that other measures may be used to determine a desired location of the occlusion member based on one or more signals received by the magnetic sensor(s) of the catheter.

The catheter 20 may further include a guide lumen for use with a guidewire. For example, the guide lumen may extend from the proximal end to the distal end of the catheter. In this way, the catheter may be introduced by way of a guidewire as is known in the art.

In some embodiments, the catheter 20 further includes an accelerometer. For example, the distal end 24 of the catheter 20 may have an accelerometer (for example, a 3-axis accelerometer) to provide positional information to the operator and/or to record historical position information. In some embodiments, the catheter 20 (for example, the distal end 24 of the catheter 20) further includes one or more gyroscopes to provide orientation information.

In another aspect, an MT-REBOA system includes a catheter having a magnet, and at least one sensor placed externally to the individual. In a preferred embodiment, an external array of magnetic sensors is provided. The external sensor array can detect the embedded magnet's field as it is fed up the aorta. This array of sensor information may then be processed by a computer/controller/processor to triangulate the position of the occlusion member. The external sensor array can also provide a feedback signal to the operator. For example, the array may be configured with LED lights that light up to indicate the catheter position (LEDs light up as the catheter passes below the respective LEDs).

Figure 7:
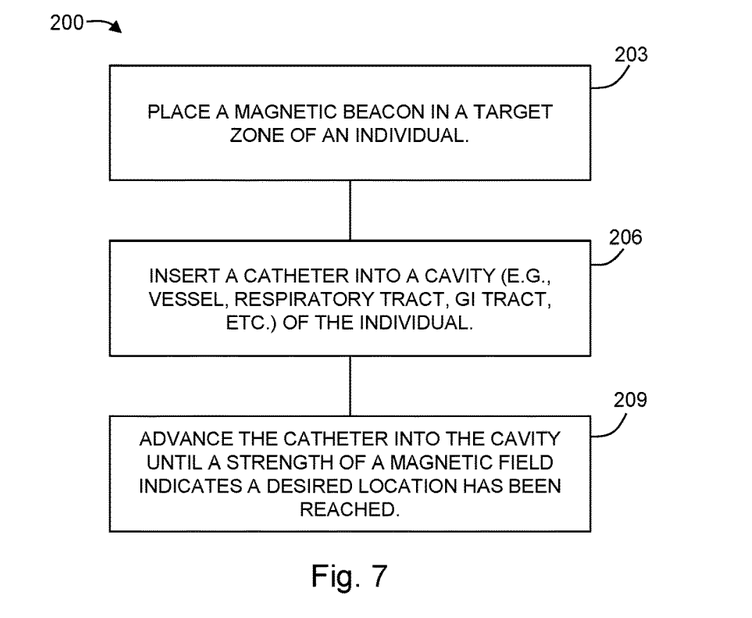
FIG. 7 is a chart depicting a method according to another embodiment of the present disclosure.

In another aspect, the present disclosure may be embodied as a method 200 for tracking a catheter. The method includes placing 203 a magnetic beacon on an individual in a target zone. A catheter is inserted 206 into a cavity of the individual. The catheter has a first magnetic sensor disposed at a distal end. The catheter may be similar to any catheter disclosed herein or other catheters (e.g., catheters used for purposes other than occlusion, etc.) The method 200 includes advancing 209 the catheter into the cavity until a strength of a magnetic field detected by the first magnetic sensor is indicative of the distal end of the catheter being at a desired location. For example, the desired location may be a location where the first magnetic sensor is adjacent to the magnetic sensor. In another example, the desired location may be a location where the first magnetic sensor is offset from the magnetic sensor. The first magnetic sensor may be in communication with an operator interface, and the operator interface may indicate a relative strength of a sensed magnetic field of the magnetic beacon. The catheter may include a second magnetic sensor at the distal end, and advancing 209 the catheter may then be based on a strength of a magnetic field detected by the second magnetic sensor.

Figure 8:
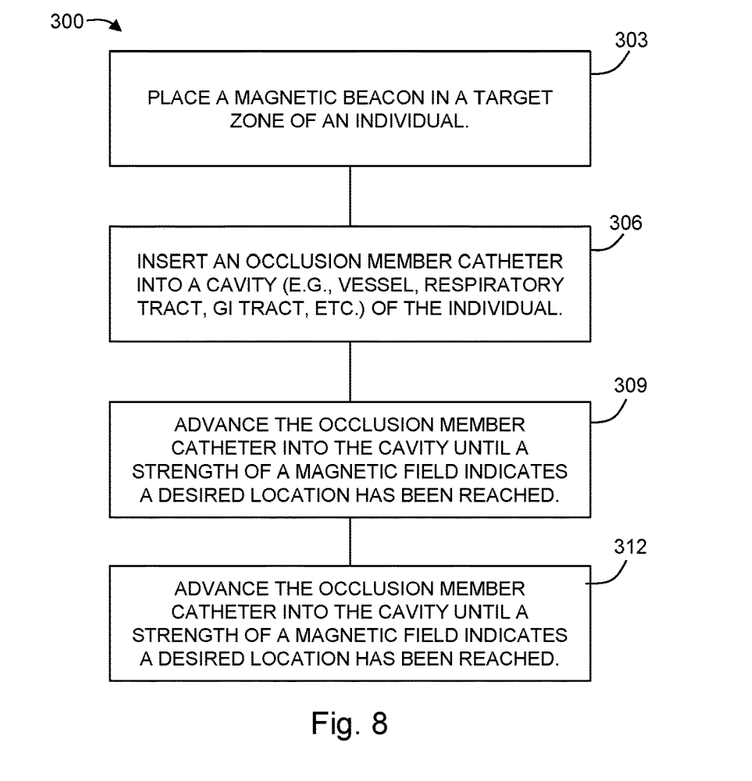
FIG. 8 is a chart depicting a method according to another embodiment of the present disclosure.

In another aspect, the present disclosure may be embodied as a method 300 for vessel occlusion. Such a method 300 includes placing 303 a magnetic beacon on an individual in a target zone. An occlusion member catheter is inserted 306 into a vessel of the individual. The occlusion member catheter includes an inflatable occlusion member and a first magnetic sensor disposed proximate to the occlusion member. The occlusion member catheter may be similar to any of the catheters described herein or other catheters. The occlusion member catheter is advanced 309 into the vessel until a strength of a magnetic field detected by the first magnetic sensor is indicative of the occlusion member being at a location adjacent to the magnetic sensor. The occlusion member is inflated 312 to occlude the vessel, thereby stopping a flow of blood through the vessel. The first magnetic sensor may be in communication with an operator interface, and the operator interface may indicate a relative strength of a sensed magnetic field of the magnetic beacon.

The occlusion member catheter may include a second magnetic sensor at the distal end. The occlusion member may be located between the first magnetic sensor and the second magnetic sensor. Advancing 309 the catheter may then be based on a strength of a magnetic field detected by the second magnetic sensor. For example, advancing 309 the occlusion member includes advancing the occlusion member until the strength of the magnetic field detected by the first magnetic sensor is equal (e.g., substantially equal) to a strength of the magnetic field detected by the second magnetic sensor.

Example 24. The method of Example 23, wherein the first magnetic sensor is in communication with an operator interface, and the operator interface indicates a relative strength of a sensed magnetic field of the magnetic beacon.

In an illustrative example, an array of MEMS magnetometers is arranged on the patient's surface. The array may include, for example, three sensors, though additional sensors provide additional spatial resolution. As the catheter enters the detection range of the array, a sensor-fusion algorithm may be used to estimate the position and orientation of the magnet inside the catheter. This position could be related to the position of the occlusion member, and a feedback signal could be emitted to indicate to the user the progress of their advance.

First Exemplary Embodiment

In a first illustrative example, not intended to be limiting, an MT-REBOA system included three MEMS magnetometers aligned in the catheter. The first and second magnetic sensors (the "detectors") straddled an occlusion member and were spaced approximately 6 cm apart. The third magnetic sensor (the "background rejector") was offset by a distance towards the proximal end of the catheter, approximately 8 cm from the nearest other magnetic sensor.

The MT-REBOA system was able to indicate when the catheter occlusion member was positioned directly under the magnetic beacon. The detection depth was most influenced by the strength of the magnetic beacon. In the prototype embodiment, a 1"×0.25" cylindrical neodymium magnet (N52 grade) was used, which had a useful field range of about 20-25 cm broadside-on.

Figure 5:
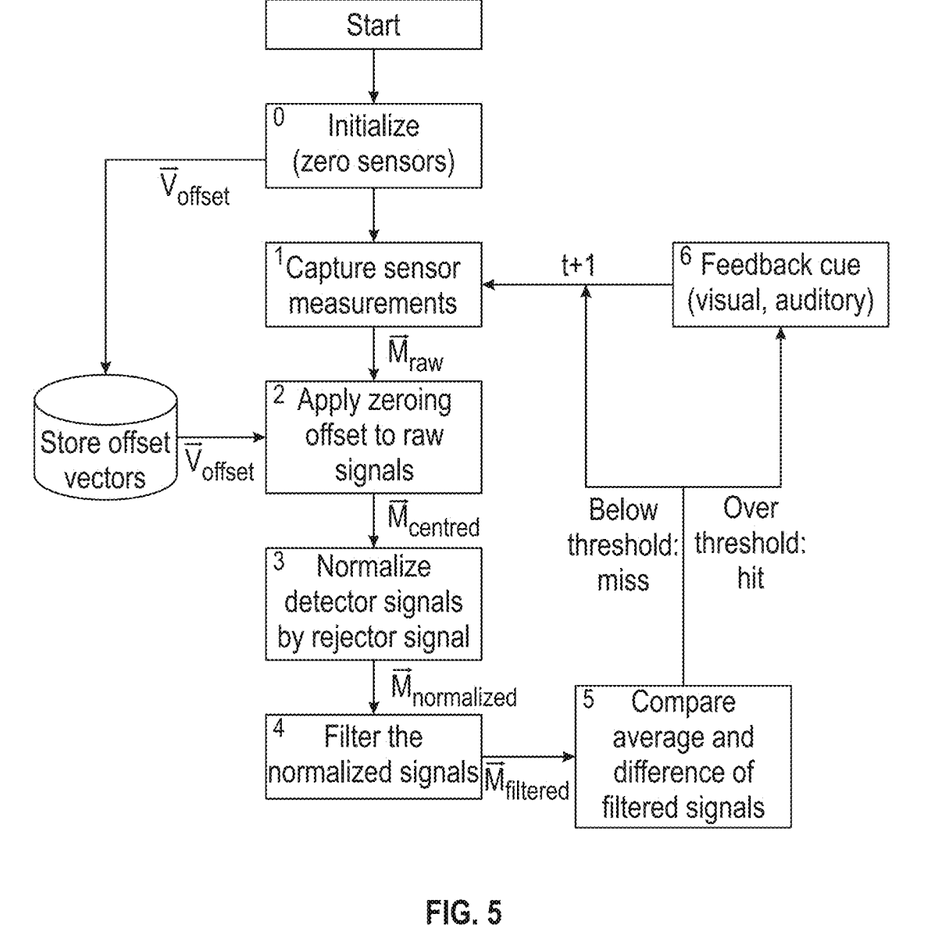
FIG. 5. MT-REBOA signal processing flowchart.

FIG. 5 is a flow chart showing the signal processing used in the prototype embodiment. The prototype version was able to run in real time at 40-60 Hz. In this embodiment, steps 0-3 were performed using a microprocessor, and steps 4-6 were performed using a PC. One having skill in the art will recognize that these steps (and/or others) can be performed using a single PC/microprocessor or split up in any way using microprocessors, field-programmable gate arrays, digital signal processors, and/or discrete logic, etc.

With respect to the exemplary signal processing scheme:

Step 0. The sensors are zeroed on start-up, and an offset vector $\vec{V}_{offset}$ is stored in memory. This step should be done in magnetically-clean space for best performance. The system can be re-zeroed during use, overwriting $\vec{V}_{offset}$. After brief initialization (<1 s), a main feedback loop begins.

Step 1. Sample the magnetic field $\vec{M}_{raw}$ for each sensor.

Step 2. Apply the offset correction $\vec{V}_{offset}$ from initialization step, which removes sensor bias and give $\vec{M}_{centered}$.

Step 3. Subtract away the background rejector (third magnetic sensor) measurement from the detectors (first and second magnetic sensors). This gives the relative magnetic field in the detectors with respect to rejector (making the system invariant to catheter orientation).

Step 4. Optionally, apply a low-pass filter to remove artifacts and smooth the signal: $\vec{M}_{filtered}$.

Step 5. Compare the average and difference of the detectors' readings. If the magnitude of the difference exceeds the average (plus a constant), the catheter is not in the proper location. If the difference is less than the average (plus a constant), the catheter is in the proper location (e.g., beneath the external magnet). This is a simplified description, the localization space need not be a simple binary hit/miss, but the system can assess the precision of the catheter position.

Step 6. If the signal indicates proper location, then produce a feedback cue (e.g., audible, visual, tactile, etc.)

Figure 6:
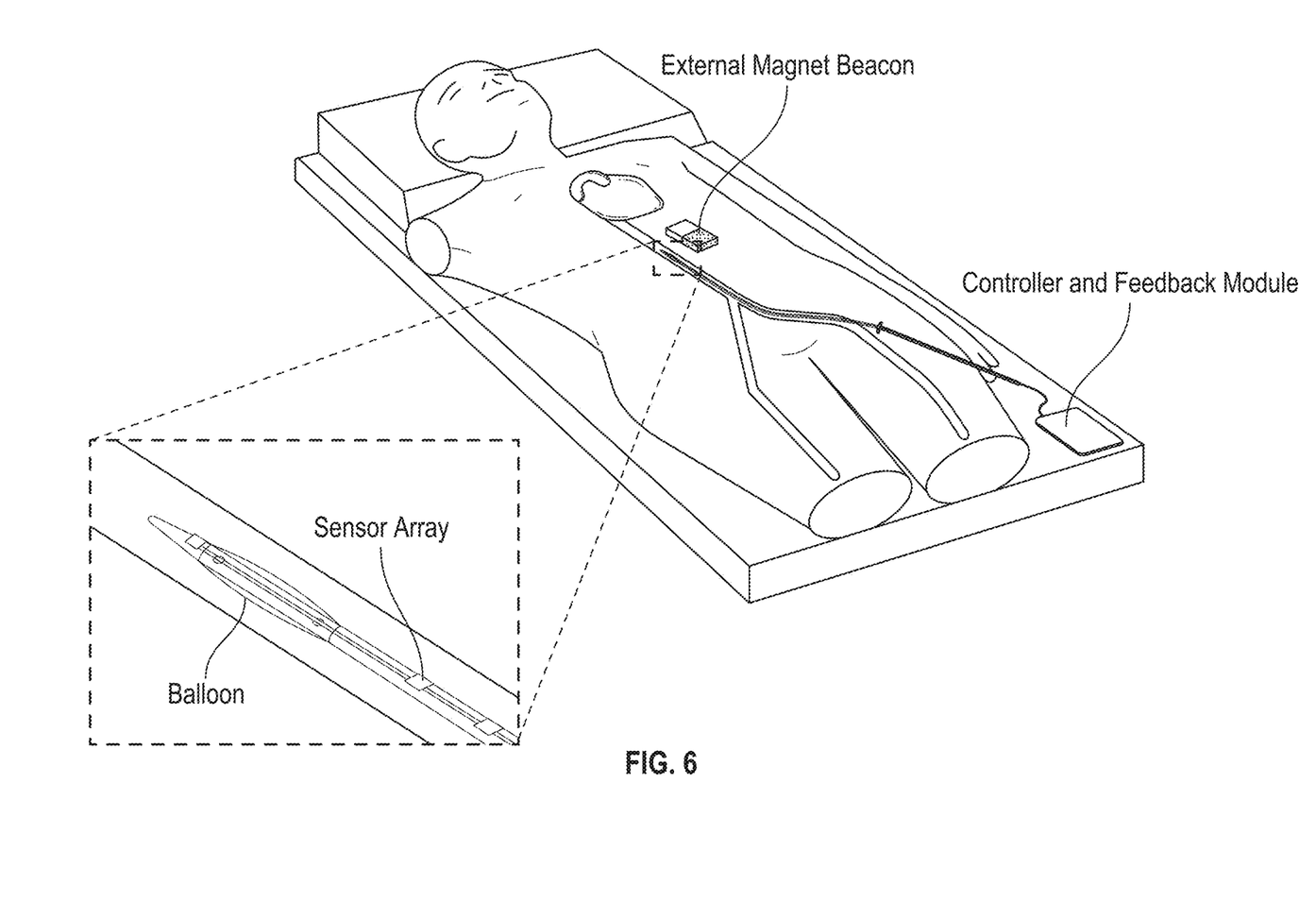
FIG. 6 is a diagram of a test embodiment of the present disclosure.

In another exemplary embodiment, a prototype magnetically trackable REBOA system was built for use in a pre-clinical validation study. The non-limiting test embodiment included a balloon catheter. The catheter had a diameter of 10 French, and the balloon had an inflated diameter of 40 mm. A magnetic sensor array from MOLLI Surgical, Inc. was attached to the catheter 20 mm from the distal end of the balloon. (FIG. 6). The magnetic sensor array was in wired communication with the operator interface. A magnetic beacon included a permanent magnet contained within a housing and wrapped in hear-shrink tape. Tungsten fiducial markers were mounted on the magnetic beacon to provide radio-opaque properties to the magnetic beacon for verification.

The magnetic beacon was placed externally on top of the skin at a location corresponding to the desired aortic landing zone. The magnetic sensor array was in signal communication with a microcontroller of the operator interface. In this way, the microcontroller received an electrical signal corresponding to a strength of the magnetic field sensed by the array. This information was used to provide continuous auditory and visual feedback signals to the operator on a display. The magnetic sensor array was determined to be located directly under the magnetic beacon when a difference between the fields sensed by sensors of the array was minimized. The feedback provided by the operator interface enabled the operator to determine the location of the balloon in real-time. Any movement of the magnetic sensor array away from the magnetic beacon resulted in an immediate prompt to the operator, and the operator could then optionally move the magnetic beacon along the body to determine the new location of the catheter.

The test embodiment was used on several porcine subjects. The aortic target zones were determined using external landmarks corresponding to the distal thoracic aorta (zone 1—xiphoid) and distal abdominal aorta (zone 3—umbilicus). The magnetic beacon was initially positioned target zone 1. The catheter was then inserted into the femoral artery of the subject and advanced using a guidewire. As the catheter moved closer to the target zone indicated by the magnetic beacon, the operator interface provided corresponding feedback—increasing auditory and visual signals. The feedback signals reached a maximum when the catheter was believed to be located under the magnetic beacon, and the balloon was inflated. The position of the balloon was confirmed in zone 1 using C-Arm fluoroscopy.

The magnetic beacon was then moved to zone 3, and the catheter was pulled distally until the operator interface indicated the position of the balloon under the beacon at zone 3. The position was again confirmed using fluoroscopy. The test procedures were performed ten times, alternating from zone 1 to zone 3, and the balloon position was confirmed by fluoroscopy each time.

The results showed that the external passive magnet allowed the operator to accurately guide the landing of the MT-REBOA balloon every time, regardless of the aortic target zone. Moreover, the MT-REBOA technology allowed real-time detection of the location of the balloon during changes in the position of the catheter.

In the following, various further examples of the present disclosure are described:

Example 1. A magnetically-tracked catheter system, comprising: a catheter having a proximal end and a distal end, the catheter comprising a first magnetic sensor disposed at the distal end of the catheter; a magnetic beacon configured to be disposed external to an individual and in a target zone; and an operator interface in electronic communication with the first magnetic sensor.

Example 2. The system of Example 1, wherein the catheter further comprises an occlusion member at the distal end proximate to the first magnetic sensor, the occlusion member configured for vessel occlusion.

Example 3. The system of Example 2, wherein the catheter further comprises an inflation lumen disposed through the catheter and in operable communication with the occlusion member.

Example 4. The system of any one of Examples 2-3, further comprising a second magnetic sensor disposed at the distal end of the catheter and proximate the occlusion member such that the occlusion member is disposed between the first magnetic sensor and the second magnetic sensor, and wherein the operator interface is in electronic communication with the second magnetic sensor.

Example 5. The system of any one of Examples 2-4, wherein the operator interface includes a detection circuit configured to detect a location of the magnetic beacon based on signals received from the first magnetic sensor and the second magnetic sensor.

Example 6 The system of any one of Examples 2-5, further comprising a third magnetic sensor spaced apart from the first magnetic sensor and the second magnetic sensor, and wherein the operator interface is in electronic communication with the third magnetic sensor.

Example 7. The system of Example 6, wherein the third magnetic sensor is spaced apart from the first magnetic sensor and/or the second magnetic sensor by at least a reference distance.

Example 8. The system of any one of Examples 2-7, wherein the magnetic beacon comprises a magnet.

Example 9. The system of Example 8, wherein the magnet is a permanent magnet.

Example 10. The system of Example 8, wherein the magnet is an electromagnet configured to be selectively magnetized or demagnetized.

Example 11. The system of any one of Examples 2-8 and 10, wherein the magnetic beacon is configured to have a variable magnetic field.

Example 12. The system of Example 11, wherein the magnetic beacon is configured to have a magnetic field which varies by frequency and/or magnitude.

Example 13. The system of any one of Examples 2-12, wherein the catheter further includes a guide lumen extending between the proximal end and the distal end and the configured for use with a guidewire.

Example 14. The system of any one of Examples 2-13, wherein the operator interface includes a detection circuit configured to detect a location of the magnetic beacon based on signals received from the first magnetic sensor.

Example 15. The system of any one of Examples 2-14, wherein the operator interface is operable to indicate a location of the magnetic beacon relative to the first magnetic sensor.

Example 16. The system of any one of Examples 2-15, wherein the operator interface is operable to indicate a location of the magnetic beacon relative to the first magnetic sensor and the second magnetic sensor.

Example 17. The system of any one of Examples 2-16, wherein the magnetic sensor is a magnetometer.

Example 18. A method for catheter tracking, comprising: placing a magnetic beacon on an individual in a target zone; inserting a catheter into a cavity of the individual the catheter having a first magnetic sensor disposed at a distal end; and advancing the catheter into the cavity until a strength of a magnetic field detected by the first magnetic sensor is indicative of the distal end of the catheter being at a desired location.

Example 19. The method of Example 18, wherein the desired location is a location where the first magnetic sensor is adjacent to the magnetic sensor.

Example 20. The method of Example 18, wherein the desired location is a location where the first magnetic sensor is offset from the magnetic sensor Example 21. The method of any one of Examples 18-20, wherein the first magnetic sensor is in communication with an operator interface, and the operator interface indicates a relative strength of a sensed magnetic field of the magnetic beacon.

Example 22. The method of any one of Examples 18-21, wherein the catheter includes a second magnetic sensor near the distal end; and wherein advancing the catheter is further based on a strength of a magnetic field detected by the second magnetic sensor.

Example 23. A method for vessel occlusion, comprising: placing a magnetic beacon on an individual in a target zone; inserting an occlusion member catheter into a vessel of the individual, the occlusion member catheter having an inflatable occlusion member and a first magnetic sensor disposed proximate to the occlusion member; advancing the occlusion member catheter into the vessel until a strength of a magnetic field detected by the first magnetic sensor is indicative of the occlusion member being at a location adjacent to the magnetic sensor; and inflating the occlusion member to occlude the vessel, thereby stopping a flow of blood through the vessel.

Example 24. The method of Example 23, wherein the first magnetic sensor is in communication with an operator interface, and the operator interface indicates a relative strength of a sensed magnetic field of the magnetic beacon.

Example 25. The method of any one of Examples 23-24, wherein the catheter includes a second magnetic sensor in communication with the operator interface and the occlusion member is located between the first magnetic sensor and the second magnetic sensor; and wherein advancing the occlusion member is further based on a strength of a magnetic field detected by the second magnetic sensor.

Example 26. The method of any one of Examples 23-25, wherein advancing the occlusion member includes advancing the occlusion member until the strength of the magnetic field detected by the first magnetic sensor is equal to a strength of the magnetic field detected by the second magnetic sensor.

Example 27. The method of any one of Examples 23-26, further comprising calibrating the first magnetic sensor.

Although the present disclosure has been described with respect to one or more particular embodiments, it will be understood that other embodiments of the present disclosure may be made without departing from the spirit and scope of the present disclosure.

What is claimed is:

1. A magnetically-tracked catheter system, comprising:
a catheter having a proximal end and a distal end, the catheter comprising a first magnetic sensor disposed at the distal end of the catheter, a second magnetic sensor closer to the proximal end than the first magnetic sensor, and an occlusion member between the first magnetic sensor and the second magnetic sensor;
a magnetic beacon configured to be placed on a body of an individual, wherein the magnetic beacon is configured to generate a magnetic field detectable by the first magnetic sensor and the second magnetic sensor; and
an operator interface in electronic communication with the first magnetic sensor and the second magnetic sensor, the operator interface comprising a detection circuit configured to detect a location of the occlusion member of the catheter based on comparing signals received from the first magnetic sensor and the second magnetic sensor, wherein the detection circuit is configured to determine that the occlusion member is in a desired location when a strength of the magnetic field detected by the first magnetic sensor is equal or substantially equal to a strength of the magnetic field detected by the second magnetic sensor, and the operator interface is configured to provide an indication that the occlusion member of the catheter is in the desired location based on the determination.

2. The system of claim 1, wherein the occlusion member is configured for vessel occlusion.

3. The system of claim 2, wherein the catheter further comprises an inflation lumen disposed through the catheter and in operable communication with the occlusion member.

4. The system of claim 1, further comprising a third magnetic sensor spaced apart from the first magnetic sensor and the second magnetic sensor, and wherein the operator interface is in electronic communication with the third magnetic sensor.

5. The system of claim 4, wherein the third magnetic sensor is spaced apart from the first magnetic sensor and/or the second magnetic sensor such that the third magnetic sensor does not sense the magnetic field generated by the magnetic beacon.

6. The system of claim 1, wherein the magnetic beacon comprises a magnet.

7. The system of claim 6, wherein the magnet is a permanent magnet.

8. The system of claim 6, wherein the magnet is an electromagnet configured to be selectively magnetized or demagnetized.

9. The system of claim 1, wherein the magnetic beacon is configured to have a variable magnetic field.

10. The system of claim 9, wherein the magnetic beacon is configured to have a magnetic field which varies by frequency and/or magnitude.

11. The system of claim 1, wherein the catheter further includes a guide lumen extending between the proximal end and the distal end and configured for use with a guidewire.

12. The system of claim 1, wherein the operator interface is operable to indicate a location of the magnetic beacon relative to the first magnetic sensor.

13. The system of claim 1, wherein the operator interface is operable to indicate a location of the magnetic beacon relative to the first magnetic sensor and the second magnetic sensor.

14. The system of claim 1, wherein the magnetic sensor is a magnetometer.

15. A method for catheter tracking, comprising:
placing a magnetic beacon on a body of an individual, wherein the magnetic beacon is configured to generate a magnetic field detectable by a first magnetic sensor and a second magnetic sensor of a catheter;
inserting the catheter into a cavity of the individual, wherein the catheter comprises the first magnetic sensor disposed at a distal end of the catheter, the second magnetic sensor disposed closer to a proximal end of the catheter than the first magnetic sensor, and an occlusion member between the first magnetic sensor and the second magnetic sensor;
advancing the catheter into the cavity until a strength of the magnetic field detected by the first magnetic sensor is determined by a detection circuit to be equal or substantially equal to a strength of the magnetic field detected by the second magnetic sensor so as to indicate that the occlusion member of the catheter is at a desired location; and
providing, via an operator interface, an indication that the occlusion member is in the desired location.

16. The method of claim 15, wherein the desired location is a location where the first magnetic sensor is adjacent to the magnetic beacon.

17. The method of claim 15, wherein the desired location is a location where the first magnetic sensor is offset from the magnetic beacon.

18. The method of claim 15, wherein the first magnetic sensor is in communication with an operator interface, and the operator interface indicates a relative strength of a sensed magnetic field of the magnetic beacon.

* * * * *